Jan. 20, 1948.   R. C. SANDERS, JR   2,434,813
AIRCRAFT NAVIGATION
Filed July 29, 1944   2 Sheets-Sheet 1
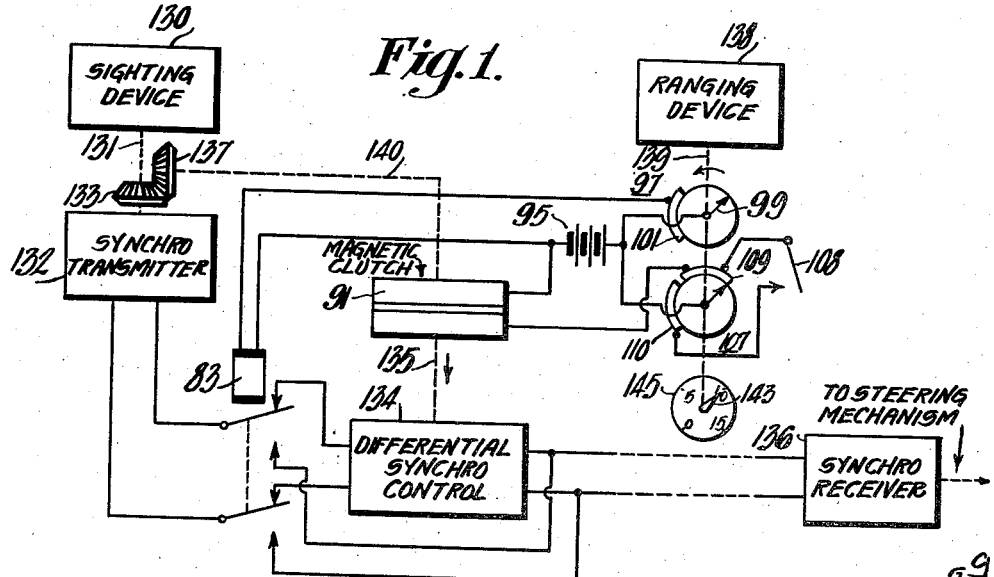
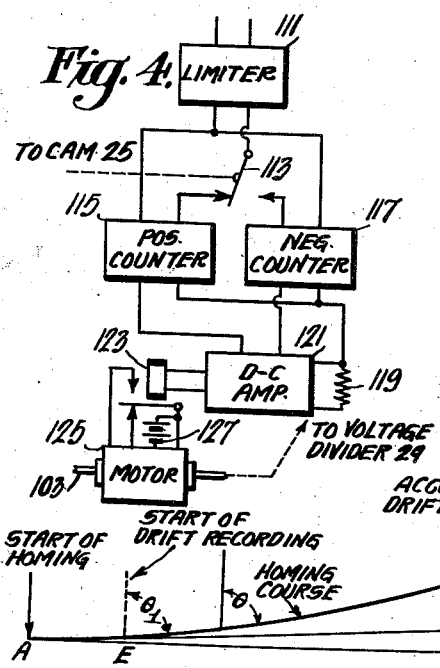
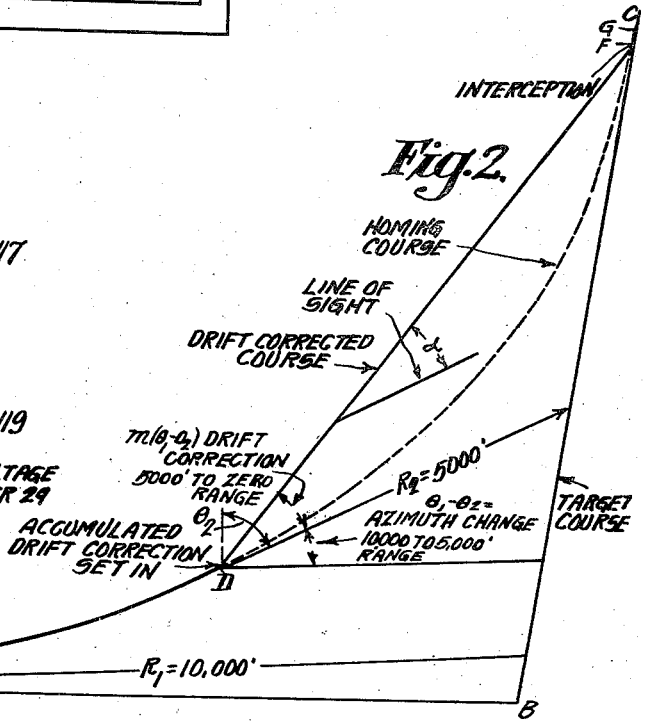
INVENTOR.
Royden C. Sanders, Jr.
BY
ATTORNEY

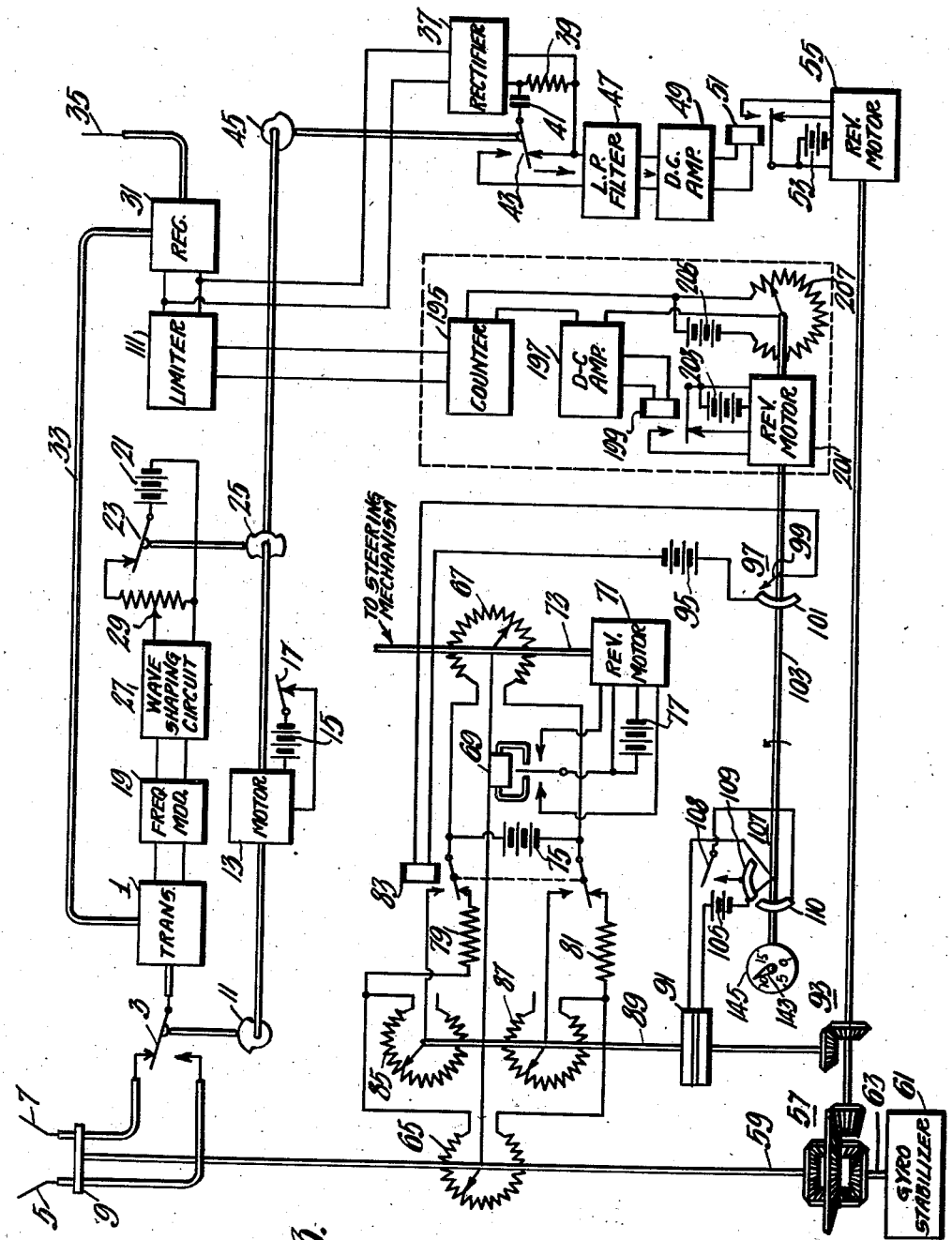

Patented Jan. 20, 1948

2,434,813

UNITED STATES PATENT OFFICE 2,434,813

AIRCRAFT NAVIGATION

Royden C. Sanders, Jr., Hightstown, N. J., assignor to Radio Corporation of America, a corporation of Delaware Application July 29, 1944, Serial No. 547,203

6 Claims. (Cl. 250—1.54)

This invention relates to aircraft navigation and more particularly to improvements in the art of controlling automatically the direction of travel of an aircraft or the like to intercept a selected moving target or other objective.

It is well known in prior art practice to direct automatically the travel of a mobile craft by means of a sighting device or radio direction finder which is maintained in alignment with the objective. If the craft is continuously directed toward the objective, a so-called "homing course" is followed. In the presence of drift caused by crosswind, the homing course will be a curved path. Motion of the objective with a component perpendicular to the line of sight produces substantially the same effects as drift, and the term "drift" as used herein is intended to include such motion of the objective. The term "line of sight" is intended to mean the line between the objective and the craft as determined in any manner, for example, by means of radio direction finder apparatus. The objective is referred to hereinafter as the target, and the controlled mobile craft is designated as the "seeker."

It can be demonstrated that if the seeker velocity is greater than twice the target velocity, the seeker will never reach the center of the target by following a homing course. This fact is of only academic importance even if collision with the target or bombing by the seeker is contemplated, because a hit at any vulnerable point on a target of finite size will ordinarily be satisfactory. An important practical consideration arises from the fact that the homing course is curved, requiring that the seeker be in a turn when the target is reached. Accurate bombing under this condition is difficult or impossible. Also, since the seeker tends to approach the target from the rear, a smaller target area is presented.

The seeker may be caused to follow a substantially linear or "navigation" course to the target by steering so that the angle between the seeker course and the line of sight remains constant. The drift is compensated by an equal component of motion of the seeker transverse to the line of sight. In practice, the navigation course is attained through a series of approximations and corrections, by altering the heading of the seeker in response to the change of the angle $\alpha$ between the existing heading and the line of sight. If the angle $\alpha$ changes by an amount $\Delta\alpha$, the seeker course is altered in such direction as to oppose the change in $\alpha$ by an amount $n\Delta\alpha$, where $n$ is a factor, greater than unity, called the navigation ratio.

The magnitude of the navigation ratio determines the rapidity with which a navigation course is approached. It is limited by the sensitivity of the sighting means to small changes in the target azimuth, by the time lag in the response of the steering means, and in the case of radio sighting means, by random variations in the apparent sight angle. The use of too large a navigation ratio will cause instability and "fishtailing" of the seeker.

Ordinarily the navigation ratio is maintained constant, or varied manually, subject to the judgment of the operator. In Patents 2,420,016 and 2,420,017, issued May 6, 1947, to R. C. Sanders, Jr., systems are described wherein the navigation ratio is automatically varied substantially continuously as a function of distance or time from target, in order to obtain the advantages of navigation while minimizing the disadvantages, particularly those which are peculiar to target seeking systems employing radio reflection means for sighting.

The principal object of the present invention is to provide improved methods of and means for automatic target seeking, wherein the required drift correction is determined by measurement of the change in sight angle over an extended period, and then set in all at once, rather than substantially continuously.

Another object is to provide methods of and means for automatically controlling a target-azimuth responsive steering system to determine and record drift throughout a predetermined period, and set in a lumped drift correction at the end of said period.

A further object is to provide a system of the described type wherein said control is accomplished as a function of the distance of the target from the seeker.

These and other objects will become apparent to those skilled in the art upon consideration of the following description, with reference to the accompanying drawing, of which Figure 1 is a schematic block diagram of a target azimuth responsive steering system embodying the instant invention; Figure 2 is a graph illustrating the operation of the system of Figure 1, Figure 3 is a more detailed schematic diagram of a system including FM radar means for target sighting and drift correction control, and Figure 4 is a schematic diagram of a modification of Figure 3. Similar reference characters indicate similar elements in the drawings.

Referring to Figure 1, a sighting device 130 is arranged to maintain a shaft 131, schematically designated by dash line, at an angular position corresponding to the azimuth, with respect to a fixed reference direction, of a selected target. The fixed reference direction may be maintained by means of a conventional gyroscope device, connected to the sighting device as in the system of Figure 3. The sighting device 130 may be of any known type. A suitable radio reflection type of sighting device is described herein with reference to Figure 2. The shaft 131 is coupled to the transmitter 132 of an electrical motion transmission system. The transmitter 132 may be of the well known "Selsyn" type or any other means performing a similar function. The output of the transmitter 132 is connected to the movable contacts of a double-throw relay 83. The relay 83 is arranged to connect the transmitter 132 directly to a receiver 136 when deenergized, and to connect the transmitter through a differential control device 134 to the receiver 136 when energized. The receiver 136 may also be of the "Selsyn" type. The differential control device 134 may be a "Selsyn" transformer, or any other suitable device for modifying the output of the transmitter 132 in accordance with rotation of its input shaft 135, so that the output shaft of the receiver 136 is maintained at an angle equal to the sum of the angular displacements of the shafts 131 and 135.

The shaft 131 is coupled through gears 133 and 137 to a shaft 140. The shaft 140 is coupled through a magnetic clutch 91 to the control shaft 135 of the differential control device 134. Thus, when the clutch 91 is engaged, rotation of the shaft 131 through an angle $\theta$ will cause rotation of the shaft 135 through an angle $m\theta$, where $m$ is the ratio of the gears 133 and 137.

A target ranging device 138 is arranged to maintain a shaft 139 in an angular position corresponding to the range of the selected target. The ranging device 138 may be of the radio reflection type as described with reference to Figure 3, or any other suitable target range responsive system. A pointer 143 may be provided on the shaft 139, cooperating with scale 145 to indicate target range. A switch 97 is connected between a battery 95 and the actuating coil of the relay 83. The switch 97 comprises an arcuate fixed contact 101 and a rotatable contact 99 coupled to the shaft 139. A second switch 107, similar in construction to the switch 97, is connected between the battery 95 and the actuating circuit of the magnetic clutch 97. The switch 107 is provided with two arcuate contacts 109 and 110, which may be connected together by a manually operable switch 108. The contact 109 extends through an arc corresponding to target ranges from 10,000 to 5,000 feet, for example. The contact 110 extends through an arc corresponding to ranges of 5,000 feet to zero. The contact 101 of the switch 97 also extends through an arc corresponding to the range 5,000 feet to zero. The above ranges are given merely by way of example, and may be made of any required values.

In the operation of the system, the selected target is picked up at a range exceeding 10,000 feet. Thus the switches 97 and 107 are both open; the magnetic clutch 91 is disengaged and the relay 83 is deenergized, connecting the transmitter 132 directly to the receiver 136. The shaft 131 of the sighting device 130 drives the transmitter 132, which controls the receiver 136 to drive its output shaft correspondingly. The steering mechanism of the seeker craft is controlled thereby to cause the seeker to follow a homing course toward the target. As the seeker moves toward the target, the shaft 139 is rotated by the ranging device 138. When the seeker reaches a distance of 10,000 feet from the target, the switch 107 is closed, energizing the clutch 91. The seeker continues to follow a homing course but with each change $\Delta\theta$ in the line of sight to the target, the shaft 135 of the differential control device 134 is rotated through an angle $m\Delta\theta$.

Referring to Figure 2, the target moves along the line B—C, and is first picked up by the seeker when the seeker is at the point A and the target is at the point B. It is assumed that the seeker speed is twice the target speed. The seeker follows a homing course indicated by the curved line A—D. At the point E on this course, the target range is $R_1=10,000$ feet, and the target azimuth is $\theta_1$. It is at this point that the drift recording is started. The seeker continues along the homing course to the point D, where the range is 5,000 feet and the azimuth is $\theta_2$. The change in azimuth during the travel of the seeker from E to D is $\theta_1-\theta_2$, and the shaft of the differential control device 134 has been rotated through an angle $m(\theta_1-\theta_2)$.

As the seeker arrives at the point D, the switch 97 is closed by the ranging device 138, energizing the relay 83. The differential control device 134 is connected between the transmitter 132 and the receiver 136, superimposing the effect of the accumulated displacement of the shaft 135 upon the control signal, and causing the output shaft of the receiver 136 to assume an angle $m(\theta_1-\theta_2)$ with respect to the position $\theta_2$ of the shaft 131.

Assuming that the switch 108 is open, the clutch 91 is now disengaged, and no further rotation of the shaft 135 occurs. Subsequent to the abrupt change in course of the seeker craft at the point D, caused by the operation of the relay 83, the steering operation is similar to that of homing, with the exception that the course is displaced at an angle $\alpha$ with respect to the line of sight. $\alpha$ is equal to $m(\theta_1-\theta_2)$. As long as the target maintains its original course and speed, $\alpha$ remains constant and no further change takes place in the steering of the seeker craft. The seeker follows the linear course D—F to the point of interception F on the target course D—C. For the purpose of comparison, the homing course A—D is extended from the point D in the dotted line D—G.

If the drift were always precisely compensated by the above-described operation, and remained constant, it would be unnecessary to provide any further control of the steering mechanism after the accumulated correction is set in at the point D. However, inaccuracies in the drift correction will occur as a result of variation in the drift and it is preferable, therefore, to retain some control of the steering in response to target azimuth. This is done in the system of Figure 1, since the transmitter 132 is not disconnected. Thus any variation in the drift will cause the seeker course to curve somewhat between the points D and F, but only by an amount corresponding to the error in drift correction, rather than the total drift.

Under some circumstances, it may be desirable to provide further automatic drift compensation throughout the final leg of the seeker course from D to F. This is effected by closing the switch 108 to connect the sector 110 in the circuit of the clutch 91. This causes further drift corrections to be set in upon any change in the line of sight, as in the continuously operating systems described in the above-mentioned Patents 2,420,016 and 2,420,017. The navigation ratio remains constant however, and is a function of the gear ratio $m$.

The ratio $m$ is determined in accordance with the magnitudes of the ranges $R_1$ and $R_2$ at which the drift recording is started and the recorded drift correction set in. Thus in the system of Figure 1, the switches 97 and 107 are designed so that the range over which drift is recorded is equal to the range existing when the drift correction is made. Thus the magnitude of the correction should be equal to the total azimuth change $\theta_1-\theta_2$ which is recorded, and the ratio $m$ is therefore unity. For other values of $R_2$ and $R_1$, the ratio is $$m = \frac{R_2}{R_1 - R_2}$$

If the switch 108 is closed to provide navigation during the latter portion of the seeker course, the navigation ratio $n$ will be $m+1$.

Figure 3 illustrates schematically a system of the type described with reference to Figure 1, including FM radar means for providing automatic response to target range and target azimuth.

A radio transmitter 1 is coupled through a double-throw switch 3 to a pair of directive antennas 5 and 7. The antennas 5 and 7 are positioned on a supporting member 9 in such manner that their radiation patterns overlap, intersecting in an equi-signal line. The switch 3 is arranged to be cyclically actuated from one position to the other by means of a cam 11, driven by a motor 13. The motor 13 is energized by a battery 15, through a switch 17. Thus, as the motor 13 rotates, energy is radiated by the antennas 5 and 7 alternately in overlapping lobes.

A frequency modulator 19 is connected to the transmitter 1 to vary cyclically the frequency of operation thereof. The modulator 19 may be of the vibratory variable capacitor type, such as that described in copending U. S. Application Ser. No. 471,003, filed by Sidney V. Perry on January 1, 1943, and entitled Capacity modulator unit. The modulator 19 is preferably energized to provide substantially triangular wave variation of frequency of the transmitter 1. This may be accomplished by means of a square wave generator comprising a battery 21 and a switch 23 which is cyclically actuated by means of a cam 25 driven by the motor 13. The square wave voltage is applied to the modulator 19 through a wave shaping circuit 27 which may be merely an integrating circuit, or may comprise an arrangement of the type disclosed in copending U. S. Application Ser. No. 512,153, filed by Irving Wolff on November 29, 1943, and entitled Vibrator mechanical systems. An adjustable voltage divider 29 is included in the input circuit of the wave shaping circuit 27 to control the range of the variation in frequency of the transmitter 1.

A receiver 31 is coupled to the transmitter 1 by means of a transmission line 33. The receiver 31 is also provided with an antenna 35 which may be non-directive, but preferably has an axis of maximum response parallel to the fore and aft line of the craft upon which the equipment is mounted. The receiver 31 may comprise merely a detector and an audio frequency amplifier but preferably includes a balanced detector of the type described in U. S. Patent 2,419,046, issued to R. C. Sanders, Jr., and I. Wolff on April 15, 1947, and entitled Frequency modulated radio altimeters.

The output of the receiver 31 is applied to a rectifier 37, which is provided with a load resistor 39. The upper end of the resistor 39 is connected through a capacitor 41 to a double-throw switch 43, which is arranged to be actuated in synchronism with the switch 3 by means of a cam 45 driven by the motor 13. The fixed contacts of the switch 43 are connected respectively to a low pass filter 47 and to the lower end of the load resistor 39, so that as the switch 43 operates, the capacitor 41 is alternately connected across the resistor 39 and in series therewith to the filter 47. This arrangement is described in detail and claimed in U. S. Patent 2,433,287, issued to William R. Mercer on December 23, 1947, and entitled Comparator circuit.

The output of the filter 47 is applied to a D.-C. amplifier 49 which is connected to a relay 51. The amplifier 49 and the relay 51 are adjusted so that when the input to the amplifier 49 is of one polarity, the armature of the relay 51 is "picked up." When the amplifier input is of the opposite polarity, the armature of the relay is dropped out. Preferably the relay 51 is arranged to have a small "dead space" so that it is operated to neither of its positions unless the input to the amplifier 49 exceeds a predetermined minimum magnitude.

The contacts of the relay 51 are connected between a battery 53 and a reversible motor 55. The shaft of the motor 55 is mechanically coupled through differential gearing 57 to a shaft 59. The shaft 59 is connected to the member 9 which supports the antennas 5 and 7. A gyro stabilizer 61 is also connected through a shaft 63 to the differential 57. The stabilizer 61 includes the conventional gyroscope and any conventional torque amplifier device or equivalent means which may be required. The stabilizer 61 operates to maintain its shaft 63 in a predetermined angular position in space, independently of the motion of the craft.

The system as thus far described operates in a manner substantially identical to that described in the aforementioned Mercer application. Owing to cyclical operation of the switch 3, energy is radiated alternately by the antennas 5 and 7 in overlapping lobes. A target lying within range of the equipment will reflect some of the radiated energy back to the antenna 35. If the target lies in the equi-signal line, the input to the receiver 31 from the antenna 35 will remain constant as the switch 3 operates. However, if the target lies to one side of the equi-signal line, for example to the right, the signal arriving at the antenna 35 will be stronger when the switch 3 is in its upper position and weaker when the switch 3 is in its lower position.

The signal picked up by the antenna 35 is combined in the receiver 31 with energy conducted from the transmitter 1 through the line 33. The output of the receiver 31 will include a beat signal corresponding in average frequency to the distance of the target, as in the conventional FM altimeter. This beat signal is rectified by the rectifier 37 to provide a D.-C. voltage across the load resistor 39, proportional in magnitude to the amplitude of the beat signal, which in turn is proportional to the strength of the reflected signal picked up by the antenna 35. Thus, unless the target lies within the equi-signal line of the antennas 5 and 7, the D.-C. voltage across the resistor 39 will change cyclically between two values, synchronously with the operation of the switch 3.

Assuming that the target is to the right of the equi-signal line, the voltage across the resistor 39 will be greater during the periods when the switch 3 is in its upper position. During these periods, the switch 43 will be actuated to its lower position by the cam 45, connecting the capacitor 41 directly across the resistor 49. The capacitor 41 is thus charged to a voltage corresponding to the strength of the signal reflected by the target when the antenna 7 is radiating. When the switch 3 is in its lower position, the voltage across the resistor 39 corresponds similarly to the strength of the signal reflected from the target when the antenna 5 is radiating. At this time, the switch 43 is in its upper position, connecting the resistor 39 and the capacitor 41 in series, but in opposite polarity, to the input circuit of the filter 47. The average voltage applied to the filter 47 is thus proportional to the difference in the strengths of the signals reflected by the target in response to signals radiated by the antennas 5 and 7, respectively.

The filter 47 smooths out the cyclical variations in its input, providing a substantially steady D.-C. output of a magnitude corresponding to said average input magnitude. This output is operated to the relay 51 through the amplifier 49, as described above, to control the energization of the motor 55. When the target is off to the right of the equi-signal line, the motor 55 is energized to rotate the shaft 59 clockwise, moving the equi-signal line toward the line of sight of the target. Conversely, if the target is to the left, the motor 55 rotates the shaft 59 counter-clockwise. Thus the equi-signal line of the antennas 5 and 7 is maintained substantially continuously coincident with the line of sight of the target.

The steering of the seeker craft in response to target azimuth is affected by means of a servo system including a Wheatstone bridge circuit having variable resistance elements 65 and 67, a polarized relay 69 and a reversible motor 71. The resistance elements 65 and 67 are adjustable voltage dividers mechanically coupled to the antenna shaft 59 and the shaft 73 of the motor 71, respectively. A battery 75 is connected across the resistor 67 for energizing the bridge circuit. A battery 77 is connected to the motor 71 through the contacts of the polarized relay 69. Unbalance of the bridge circuit causes the relay 69 to deflect in one direction or the other depending upon the direction of unbalance, thus energizing the motor 71 to rotate the movable contact of the voltage divider 67, rebalancing the bridge.

The shaft 73 of the motor 71 is also connected to the steering mechanism (not shown) of the seeker craft. A pair of fixed resistors 79 and 81 are connected to respective terminals of the voltage divider 65 and to the lower fixed contacts of a double-pole double-throw relay 83. A pair of variable resistors 85 and 87 are similarly connected between respective terminals of the voltage divider 65 and corresponding upper fixed contacts of the relay 83. The resistors 85 and 87 are provided with a common shaft 89.

When the relay 83 is deenergized, the fixed resistors 81 and 79 are included in the bridge circuit, and the shaft 73 of the motor 71 will be maintained substantially continuously in an angular position corresponding to that of the antenna shaft 59. The seeker craft will be controlled thereby to head directly toward the target at all times, and hence, will follow a homing course. When the relay 83 is energized, the resistors 85 and 87 are included in the bridge circuit. As long as the movable contacts of these resistors remain in their center positions, the action will be the same as it is when the relay 83 is deenergized. However, if the shaft 89 is rotated from a center position, for example clockwise, less of the resistor 85 and more of the resistor 87 will be included in the respective bridge arms, biasing the balance point so that the shaft 73 no longer occupies a position corresponding to that of the shaft 59, but moves to a position corresponding to the sum of the angular displacements of the shafts 59 and 89. Thus the seeker craft will be steered at an angle α to the line of sight, where α is proportional to the angular displacement of the shaft 89.

The shaft 89 is coupled to the shaft of the motor 55 through a magnetic clutch 91 and gearing 93. Energization of the clutch 91 causes the shaft 89 to rotate with rotation of the motor 55, thus biasing the bridge circuit by means of resistors 85 and 87 in proportion to change in the target sight angle.

The relay 83 is connected to a battery 95 through a switch 97 which comprises a rotatable contact 99 and a fixed contact sector 101. The rotatable contact 99 is coupled to a shaft 103. The clutch 91 is connected to a battery 105 through a switch 107, similar in construction to 97 and also connected to the shaft 103. The fixed contact sector 109 of the switch 107 and the sector 101 of the switch 97 are designed so that as the shaft 103 is rotated counter-clockwise from its extreme clockwise position, the magnetic clutch 91 is energized throughout a predetermined arc of the rotation of the shaft 103, and the relay 83 is similarly energized throughout a subsequent predetermined arc.

Assuming for the present that the shaft 103 is automatically maintained at an angular position, with respect to its extreme clockwise position, corresponding to the distance of the target, the operation of the system is as follows: The relay 83 is initially deenergized so that the seeker craft flies a homing course toward the target. As the target is approached, the shaft 103 rotates counter-clockwise to an extent such that the switch 107 is closed, energizing the clutch 91. The seeker craft continues to fly a homing course since the relay 83 remains deenergized. However, the resistors 85 and 87 are adjusted with changes in the line of sight to the target.

As the shaft 103 continues to rotate, the switch 107 is opened, deenergizing and thus disengaging the clutch 91. The switch 97 is closed, energizing the relay 83. The accumulated adjustment of the shaft 89 is thereby impressed on the bridge circuit instantaneously, causing a corresponding alteration of the steering of the seeker in such direction as to compensate the drift between the target and seeker. The switch 97 remains closed up until the arrival of the seeker at the target. During this period, the seeker follows a course which is similar to a homing course but is biased in accordance with the amount of drift which took place during the period that the switch 107 was closed.

The shaft 103 is maintained automatically at a position corresponding to the target distance by a servo system comprising a limiter 111, a counter 195 and a D.-C. amplifier 197 connected in cascade to the output of the receiver 31. The amplifier 197 is connected to a relay 199, identical with the relay 51. A reversible motor 201 is connected to the relay 199 and to a battery 203 in the same manner as the motor 55 is connected to the relay 51 and the battery 53. The connection between the counter 195 and the amplifier 197 includes a variable bias source comprising a battery 205 and an adjustable voltage divider 207. The shaft of the voltage divider 207 is coupled to the motor 201. The bias provided by this arrangement opposes the output of the counter 195.

In operation, the beat output of the receiver 31 is limited to a constant amplitude by the limiter 111 and applied to the counter 195. The output of the counter 195 is a unidirectional voltage having a magnitude proportional to the frequency of the receiver output, and hence, proportional to the target range. As long as the voltage divider 207 is adjusted to provide a bias equal to the counter output voltage, the motor 201 is deenergized. Upon the occurrence of a change in the magnitude of the counter output, the D.-C. amplifier actuates the relay 199, causing the motor 201 to rotate the voltage divider 207, altering the bias to again match the counter output. Thus, the shaft of the motor 201 is maintained substantially continuously in an angular position corresponding to the target range.

Although the shaft 103 may be controlled directly as a linear function of the target distance, it may be preferable to operate as a function of the distance divided by the rate of change of distance, or time from target. A system for providing control of a shaft as a function of said time from target is described and claimed in U. S. Patent 2,432,939, issued to R. C. Sanders, Jr., on December 16, 1947, and entitled Radio navigation system. This system is illustrated herein in Figure 4 and includes a limiter 111 connected through a double-throw switch 113 to a positive counter 115 and a negative counter 117. The switch 113 is actuated by the cam 25 in synchronism with the switch 23, so that the output of the limiter 113 is applied to the positive counter during increase in frequency of the transmitted signal, and to the negative counter 117 during decrease of frequency of the transmitted signal. The counters 115 and 117 are provided with a common load resistor 119 which is connected to the input circuit of a D.-C. amplifier 121. The output circuits of the counters 115 and 117 are returned to points in the circuit of the amplifier 121 such as to provide linearity of counter operation. The output circuit of the amplifier 121 is connected to a relay 123 similar to the relay 51. A reversible motor 125 is connected through the contacts of a relay 123 to a battery 127. The motor 125 is connected to the shaft 103 and is also connected to the control shaft of the voltage divider 29. The voltage divider 29 is designed to provide a reciprocal transmission-rotation characteristic, as described in said copending U. S. application Ser. No. 534,109.

In the operation of the system, the average frequency of the beat output of the receiver 31 is proportional to the distance of the target. When the seeker is moving toward the target, Doppler effect causes the reflected signal received at the antenna 35 to be higher in frequency than the corresponding transmitted signal by an amount proportional to the speed. This causes the beat frequency to be less than the average value during increase of transmitted frequency and greater than the average value during decrease of transmitted frequency. Thus the frequency of the beat note varies between two limits which differ by an amount proportional to the speed.

The counters 115 and 117 are connected to the resistor 119 so that their outputs oppose each other. If the two counters were of equal sensitivities, the average current in the resistor 119 would be directly proportional to the speed, since the only difference in their outputs would be due to the operation of the counter 115 upon increase of transmitted frequency and the operation of the counter 117 upon decrease of transmitted frequency. However, the counter 115 is designed to be more sensitive than the counter 117 by a predetermined factor, so that the average current through the resistor 119 is proportional to $$ad-v$$

where $d$ is the distance to the target, $v$ is the velocity of the seeker with respect to the target and $a$ is the factor depending upon the band width through which the transmitter frequency is varied. The factor $a$ depends in turn upon the adjustment of the voltage divider 29. The voltage developed across the resistor 119 is amplified by the amplifier 121 to control the relay 123, energizing the motor 125 so as to rotate the voltage divider 29 to a position such as to reduce the voltage across the resistor 119 to zero. Thus the system automatically maintains conditions such that $$ad-v=0$$

Since $$\frac{d}{v}$$

is equal to the time T which will be required under current conditions for the seeker to arrive at the target, $$a=1/T$$

The transmission through the voltage divider 29 is proportional to $a$. Since the transmission is a reciprocal function of the angular position of the control shaft, the shaft will assume a position which is directly proportional to the time T.

The invention has been described as an automatic target azimuth responsive navigation system for target seeking craft. The craft is steered in response to continuous measurement of the target azimuth with respect thereto. The change in target azimuth over a predetermined portion of the seeker course is recorded, and set in substantially instantaneously at a predetermined point in said course, or at a predetermined time from target. Control of the drift recording and drift correction is effected automatically in response to substantially continuous measurement of the target range or of the time from target. Since the time from target is equal to the range divided by the rate of change of range, the term "predetermined function of range" includes both range and time from target, and is so used herein.

I claim as my invention:

1. In a target azimuth responsive steering system for mobile craft having a steering mechanism, including target sighting and ranging means providing output which are predetermined functions respectively of the azimuth and range of a selected target, and means for transmitting said azimuth output to said steering mechanism; further means responsive to said azimuth output to accumulate information as to changes in target azimuth, means responsive to said target range output to control the operation of said further means, and means responsive to said target range output to apply said accumulated information to said transmission means substantially instantaneously upon the attainment of a predetermined value of said target range output.

2. A target azimuth responsive steering system for mobile craft having a steering mechanism, including target sighting means for determining substantially continuously the azimuth of a selected target, means for transmitting said target azimuth information to said steering mechanism, means for accumulating information as to changes in said target azimuth as said craft approaches said target; target ranging means for determining substantially continuously the range of said target, and means responsive to said target ranging means to apply accumulated change of target azimuth information to said transmission means substantially instantaneously upon the attainment of a predetermined target range.

3. A steering system including a steering control shaft, radio reflection target sighting and ranging means providing outputs which are predetermined functions respectively of azimuth and range of a selected target, transmission means comprising a servo system responsive to said azimuth output to control the position of said shaft, a differential control device, switch means for selectively connecting and disconnecting said differential control device to said servo system, a clutch for selectively coupling and uncoupling said azimuth output to said differential control device, and means responsive to said range output to control said switch means and said clutch.

4. A steering system including a steering control shaft, target sighting and ranging means including output shafts and means for maintaining automatically said output shafts at angles which are predetermined functions respectively of azimuth and range of a selected target, remote control means comprising a transmitter coupled to said azimuth shaft, a receiver coupled to said steering control shaft, and electrical connections between said transmitter and receiver, a differential control device, switching means for selectively including and excluding said differential control device in said electrical connections, means for supplying mechanical input to said differential control device including an electromagnetic clutch mechanically coupled to said azimuth shaft, a switch coupled to said range shaft for energizing said clutch throughout a predetermined range of angular displacement of said range shaft, and further switching means coupled to said range shaft to include said differential control device in said electrical connections throughout a second predetermined range of angular position of said range shaft.

5. The invention as set forth in claim 4, wherein said target sighting and ranging means includes a radio transmitter, frequency modulator means for cyclically varying the frequency of operation of said transmitter, an antenna system coupled to said transmitter, means for periodically altering the directive axis of said antenna system to provide radiation alternately in two overlapping lobes intersecting in an equi-signal line, a radio receiver, comparator means connected to said receiver to provide an output proportional in magnitude to the difference in intensities of signals received thereby during radiation by said antenna respectively in said two lobes, servo means responsive to said comparator output to control the angular position of the equi-signal line of said antenna system and the angular position of said azimuth shaft, and a beat frequently responsive servo system connected to the output of said receiver and coupled to said range shaft.

6. A steering system including a steering control shaft, a radio transmitter, frequency modulator means for cyclically varying the frequency of operation of said transmitter, an antenna system coupled to said transmitter, means for periodically altering the directive axis of said antenna system to provide radiation alternately in two overlapping lobes intersecting in an equi-signal line, a radio receiver, comparator means connected to said receiver to provide an output proportional in magnitude to the difference in intensities of signals received thereby during radiation by said antenna system in said two lobes, servo means responsive to said comparator output to control the angular position of the equi-signal line of said antenna system, further servo means including a motion transmitter coupled to said antenna system and a receiver coupled to said steering control shaft, differential control means and switching means for selectively including and excluding said differential control means in said last-mentioned servo system, a clutch for selectively coupling and uncoupling said differential control means to the output of said first-mentioned servo system, and means for controlling the operation of said switching means and said clutch comprising a beat frequency responsive servo system connected to the output of said receiver.

ROYDEN C. SANDERS, JR.

REFERENCES CITED

The following references are of record in the file of this patent:

UNITED STATES PATENTS

| Number | Name | Date |
| --- | --- | --- |
| 2,176,469 | Mouiex | Oct. 17, 1939 |